A. J. BRAUER.
DOG MUZZLE.
APPLICATION FILED MAY 27, 1912.
1,068,971.
Patented July 29, 1913.
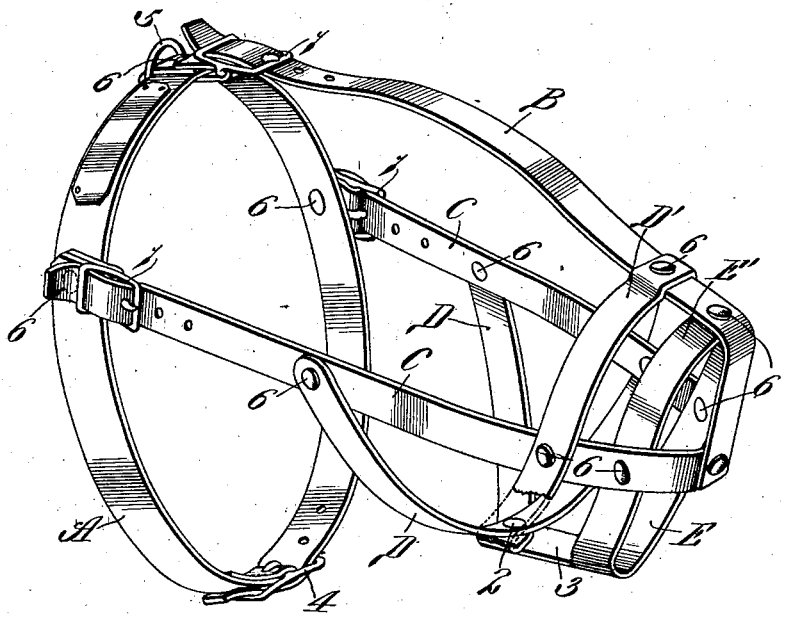
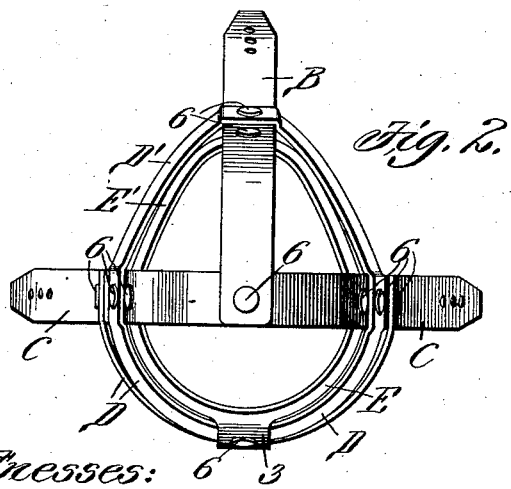
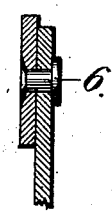
Witnesses:
Geo. R. Ladson
C. M. Badger
Inventor:
Arthur J. Brauer.
By Bakewell & Cornwell Attys.

UNITED STATES PATENT OFFICE.

ARTHUR J. BRAUER, OF ST. LOUIS, MISSOURI.

DOG-MUZZLE.

1,068,971.  Specification of Letters Patent.  Patented July 29, 1913.

Application filed May 27, 1912. Serial No. 700,007.

*To all whom it may concern:*

Be it known that I, ARTHUR J. BRAUER, a citizen of the United States, residing at St. Louis, Missouri, have invented a certain new and useful Improvement in Dog-Muzzles, of which the following is a full, clear, and exact description, such as will enable others skilled in the art to which it appertains to make and use the same.

This invention relates to dog muzzles.

One object of my invention is to provide a flexible or pliable dog muzzle that conforms to the shape of a dog's head so that it can be fastened securely in position without binding the head of the dog.

Another object is to provide a dog muzzle which is so constructed that it does not prevent the dog from raising or lifting its head freely.

Another object is to provide a dog muzzle formed from leather or some other suitable pliable material, and constructed in such a manner that the dog cannot pull it off. And still another object is to provide an efficient dog muzzle which is so designed that it does not prevent the dog from drinking when the muzzle is arranged in operative position.

Other objects and desirable features of my invention will be hereinafter pointed out.

Figure 1 of the drawings is a perspective view of a dog muzzle constructed in accordance with my invention; Fig. 2 is an end view or front elevational view of the muzzle; and Fig. 3 is a detail sectional view illustrating how the straps or members from which the muzzle is formed are connected together.

The muzzle is preferably constructed of straps of leather or other suitable flexible material, the parts being attached together with rivets. Referring to the accompanying drawing, A designates a collar or strap adapted to encircle the neck of a dog. A pair of side straps C are attached to the collar at the sides thereof. These side straps are preferably formed of a single piece of leather which extends forwardly along the sides of the head and around the nose. A top strap B is connected at one end to the collar at the upper side thereof and extends forwardly along the head and over the nose. The other end of the top strap is attached to the side straps C at a point in front of the nose when the muzzle is in position. The end of the top strap therefore terminates at the point where it is attached to the side straps. A jaw strap D' passes around and crosses below the jaws and is riveted to the side and top straps. The ends D of the jaw strap extend diagonally and rearwardly and cross under the jaw, and these ends are attached to the side straps C at points removed from the points of attachment of these side straps to the collar. A rivet 2 secures the ends of the jaw strap together at their crossing point under the jaw. A nose guard E' consisting of a single piece of material encircles the nose forwardly of the jaw strap D and is riveted to the side and top straps C and B. This nose guard is provided with an integral shank 3 extending rearwardly underneath the jaw and secured to the jaw straps at its crossing point by means of the rivet 2. The collar is provided with a buckle 4, a ring 5 and also with the usual license tag as shown in Fig. 1. The side and top straps are attached to the collar through buckles 7, and these buckles are attached to the collar by rivets 6, whereby these straps may be readily unbuckled from the collar or adjusted in length. The muzzle is molded to shape so that it will neatly fit the dog's head and retain its shape after it is in position.

A dog muzzle must be so arranged that the dog can drink and breathe and still prevent it from opening its mouth wide enough to bite. It should be so constructed that the dog can readily move its head vertically and at the same time prevent it from removing the muzzle with its paws. It should conform to the head so as to present a neat appearance, but it should consist of a few parts so as to form a skeleton structure and not a close covering which will be hot, uncomfortable and cause irritation during hot weather.

The muzzle described will meet all the requirements and conditions outlined above. When the muzzle is in position on the dog's head the collar will encircle the neck while the side straps will extend along the sides of the head above the lower jaw. The parts are so adjusted that the muzzle will fit snug. The top strap extends centrally along the head and centrally over the nose so as not to interfere with free breathing. The nose guard is so formed, and the top strap terminates at such a point that an opening E is formed, so that while the dog cannot open its mouth wide enough to bite, it can drink and hang out its tongue for free perspiration.

The usual throat strap, which extends underneath the throat and is connected with the collar and which prevents the dog from freely raising and lowering its head, is dispensed with. The jaw strap together with its diagonal connections with the side straps performs the function of the former throat strap in retaining the muzzle in position. The ends of this jaw strap extend rearwardly and diagonally and are connected to the side straps so that there is a diagonal strain placed on the ends of the jaw straps to prevent the muzzle from being pulled off. The construction however is such as to leave the throat entirely free to permit free breathing and swallowing. The connections of the side straps to the collar through the rivets 6 are loose enough to permit a vertical pivotal movement of these side straps on the collar. The entire forward part of the muzzle can therefore swing on the collar as a pivot when the dog raises and lowers its head. This is important as the points of articulation of a dog's head are directly behind its ears and therefore opposite the pivotal points of connection of the forward part of the muzzle with the collar. The construction and arrangement of the nose guard is such that while it will permit the dog to drink it will still prevent it from opening its jaws wide enough to bite. The nose guard is entirely smooth so as not to irritate the dog. The connection of the shank 3 with the jaw straps is such as to hold this nose guard in position and in shape. The entire arrangement of the straps is such as not only to permit free vertical movement but also to retain the shape of the muzzle, as the strains are applied and transmitted evenly and uniformly.

The muzzle can be readily adjusted by the buckle connections 7, and the forward part of the muzzle can be entirely removed leaving the collar together with its license tag in position on the dog's neck.

The parts are riveted together by rivets having their heads on the inside and having smooth riveted ends as shown in Fig. 3, thereby avoiding irritation and presenting a neat appearance.

Having thus described the invention what is claimed is:

1. A dog muzzle comprising a collar or strap encircling the neck, a side strap attached at its ends to said collar at the sides thereof and extending forwardly along the sides of the head and around the nose, a top strap attached to said collar at the top thereof and extending forwardly along the upper side of the head and over the nose and terminating at and attached at its end to said side strap, and a jaw strap passing around and crossing below the jaws and attached to said side and top straps, the ends of said jaw strap passing from their crossing point diagonally and rearwardly to said side strap and being attached thereto.

2. A dog muzzle comprising a collar or strap encircling the neck, side straps pivotally attached to said collar at the sides thereof and extending forwardly along the sides of the head, a top strap attached at its end to said collar at the top thereof and extending forwardly along the upper side of the head, and a jaw strap encircling the jaws and attached to said side and top straps.

3. A dog muzzle comprising a collar or strap encircling the neck, side straps pivotally attached to said collar at the sides thereof and extending forwardly along the sides of the head, a top strap attached at its end to said collar at the top thereof and extending forwardly along the upper side of the head, and a jaw strap passing around and crossing below the jaws and attached to said side and top straps, the ends of said jaw strap passing from their crossing point diagonally and rearwardly to said side straps and being attached thereto.

4. A dog muzzle comprising a collar, side straps connected to said collar and extending forwardly along the head, a jaw strap passing around the jaw and connected to said side straps, and a nose guard encircling the nose and attached to said side straps, said guard having a shank integral therewith and extending rearwardly under the jaw and connected to said jaw strap.

5. A dog muzzle comprising a collar or strap encircling the neck, side straps attached to said collar at the sides thereof and extending forwardly along the sides of the head, a top strap attached to said collar at the top thereof and extending forwardly along the upper side of the head, a jaw strap passing around and crossing below the jaws and attached to said side and top straps, the ends of said jaw strap passing from their crossing point diagonally and rearwardly to said side straps and being attached thereto, and a nose guard encircling the nose and attached to said side and top straps, said guard having a shank integral therewith and extending rearwardly under the jaw and attached to said jaw strap.

6. A dog muzzle comprising a collar, side and top straps extending along the sides and top of the head together with a jaw strap encircling the jaw and attached to said side and top straps, and means for detachably
5 connecting the ends of said side and top straps with said collar.

In testimony whereof I hereunto affix my signature in the presence of two witnesses, this twenty-fourth day of May 1912.

ARTHUR J. BRAUER.

Witnesses:
WELLS L. CHURCH,
GEORGE BAKEWELL.

Copies of this patent may be obtained for five cents each, by addressing the "Commissioner of Patents, Washington, D. C."